US007523453B2

(12) United States Patent
Allen

(10) Patent No.: US 7,523,453 B2
(45) Date of Patent: Apr. 21, 2009

(54) SYSTEM, METHOD AND PROGRAM PRODUCT FOR MAINTAINING SESSION INFORMATION DURING DYNAMIC RESOURCE ADDITIONS OR UPDATES

(75) Inventor: Joshua S. Allen, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 903 days.

(21) Appl. No.: 10/632,236

(22) Filed: Jul. 31, 2003

(65) Prior Publication Data

US 2005/0028162 A1 Feb. 3, 2005

(51) Int. Cl.
G06F 9/46 (2006.01)
G06F 9/455 (2006.01)
(52) U.S. Cl. ...................... 718/104; 717/174
(58) Field of Classification Search ................. 718/104; 717/164, 174
See application file for complete search history.

(56) References Cited

U.S. PATENT DOCUMENTS

| 5,031,089 | A | 7/1991 | Liu et al. |
|---|---|---|---|
| 5,113,522 | A | 5/1992 | Dinwiddie, Jr. et al. |
| 5,404,494 | A | 4/1995 | Garney |
| 5,838,968 | A | 11/1998 | Culbert |
| 5,901,315 | A | 5/1999 | Edwards et al. |
| 6,067,580 | A | 5/2000 | Aman et al. |
| 6,185,734 | B1 * | 2/2001 | Saboff et al. ................ 717/164 |
| 6,321,373 | B1 | 11/2001 | Ekanadham et al. |
| 6,330,656 | B1 | 12/2001 | Bealkowski et al. |
| 6,338,072 | B1 | 1/2002 | Durand et al. |
| 6,360,263 | B1 | 3/2002 | Kurtzberg et al. |
| 6,366,945 | B1 | 4/2002 | Fong et al. |
| 6,396,515 | B1 | 5/2002 | Hetherington et al. |
| 6,766,373 | B1 * | 7/2004 | Beadle et al. ................ 709/227 |
| 7,062,527 | B1 * | 6/2006 | Tyrrell, III .................. 709/201 |

FOREIGN PATENT DOCUMENTS

| JP | 06052123 | 2/1994 |
|---|---|---|
| WO | WO 99/33211 | 7/1999 |

OTHER PUBLICATIONS

Son et al., "A Dynamic Resource Allocation Algorithm Based on Multiple Traffic Class Structure in ATM Networks", INSPEC, 2nd Asia-Pacific Conference on Communications, Pt. vol. 2, pp. 898-902, Jun. 1995.
IBM Technical Disclosure Bulletin, Dynamic Allocation of Processes and Threads for Transaction Processing, vol. 41, No. 01, pp. 499-500, Jan. 1998.

* cited by examiner

*Primary Examiner*—Meng-Ai An
*Assistant Examiner*—Eric C Wai
(74) *Attorney, Agent, or Firm*—Andre Gibbs; Hoffman Warnick LLC

(57) ABSTRACT

Under the present invention, a system, method, and program product for dynamically adding resources in a web application server are provided. The method comprises: providing a resource; detecting an availability of the resource using a resource lookup web application; installing the resource into the resource lookup web application and, once installed, advertising the resource to the at least one web application; receiving a request for the resource from the at least one web application; and dynamically adding the resource to each requesting web application without having to restart the requesting web application and without losing session information in the requesting web application.

6 Claims, 3 Drawing Sheets

SYSTEM, METHOD AND PROGRAM PRODUCT FOR MAINTAINING SESSION INFORMATION DURING DYNAMIC RESOURCE ADDITIONS OR UPDATES

BACKGROUND OF THE INVENTION

1. Field of the Invention

The present invention generally relates to a system, method and program product for dynamically adding resources to, or updating resources in, a web application. Specifically, the present invention provides a way to maintain session information when dynamically adding JAVA™ resources to, or updating JAVA™ resources in, a web application ("JAVA" is a trademark of Sun Microsystems, Inc., Santa Clara, Calif.).

2. Related Art

Web application servers typically allocate each web application its own class loader. To this extent, new class files can be dynamically added to a web application (or replaced) without restarting the web application server. Unfortunately, when a particular web application receives new class files, it invalidates, and therefore loses, all its current session information. As known in the art, a session is a sequence of service requests by a single user using a single client to access a server. The information maintained in the session across requests is called session state. Session state may include both information visible to the user (shopping cart contents, for example) and invisible application control information (such as user preferences).

In view of the foregoing, there exists a need for a system, method and program product for dynamically adding JAVA™ resources (e.g. JAVA™ ResourceBundles, class files, properties, images, etc.) to, or updating JAVA™ resources in, a web application without requiring the web application or a corresponding web application server to be restarted and without losing session state.

SUMMARY OF THE INVENTION

In general, the present invention provides a system, method and program product for dynamically adding JAVA™ resources to, or updating JAVA™ resources in, a web application without requiring the web application or a corresponding web application server to be restarted and without losing session state. Specifically, under the present invention, to preserve session information and prevent restarting of the end user web application, JAVA™ resources (e.g., JAVA™ ResourceBundles) are not obtained directly (e.g., via the JAVA™ ResourceBundle.getBundle call), which would retrieve the JAVA™ resources from the class loader of the web application. Rather, JAVA™ resources are obtained indirectly from a separate web application (i.e., a Resource Lookup Web Application (RLWA)), whose only duty is to serve JAVA™ resources.

A first aspect of the present invention provides a method for dynamically adding resources in a web application server, wherein the web application server includes at least one web application and a resource lookup web application, comprising: providing a resource; detecting an availability of the resource using the resource lookup web application; installing the resource into the resource lookup web application and, once installed, advertising the resource to the at least one web application; receiving a request for the resource from the at least one web application; and dynamically adding the resource to each requesting web application without having to restart the requesting web application and without losing session information in the requesting web application.

A second aspect of the present invention provides a method, comprising: dynamically adding a JAVA™ resource to at least one web application in a web application server without having to restart the web application and without losing session information in the web application.

A third aspect of the present invention provides a system for dynamically adding resources in a web application server, wherein the web application server includes at least one web application and a resource lookup web application, comprising: a system for detecting a resource; a system for installing the resource into the resource lookup web application and, once installed, for advertising the resource to the at least one web application; and a system for receiving a request for the resource from the at least one web application and for providing the resource to each requesting web application; wherein the resource is dynamically added to each requesting web application without having to restart the requesting web application and without losing session information in the requesting web application.

A fourth aspect of the present invention provides a program product stored on a recordable medium for dynamically adding resources in a web application server, wherein the web application server includes at least one web application and a resource lookup web application, which when executed, comprises: program code for detecting a resource; program code for installing the resource into the resource lookup web application and, once installed, for advertising an availability of the resource to the at least one web application; and program code for receiving a request for the resource from the at least one web application and for providing the resource to each requesting web application; wherein the resource is dynamically added to each requesting web application without having to restart the requesting web application and without losing session information in the requesting web application.

Therefore, the present invention provides a system, method and program product for dynamically adding JAVA™ resources to, or updating JAVA™ resources in, a web application without requiring the web application or a corresponding application server to be restarted and without losing session state.

BRIEF DESCRIPTION OF THE DRAWINGS

These and other features of this invention will be more readily understood from the following detailed description of the various aspects of the invention taken in conjunction with the accompanying drawings in which.

Figure 1:
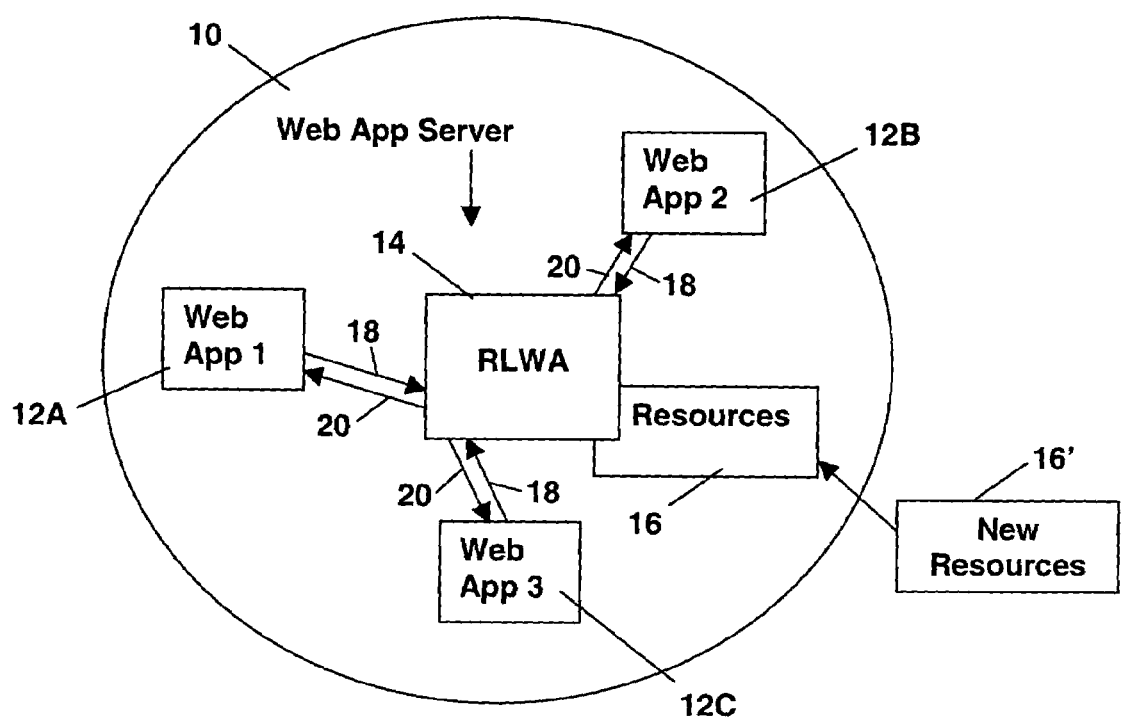
FIG. 1 depicts a web application server including a plurality of web applications and a Resource Lookup Web Application (RLWA) in accordance with the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a system, method and program product for dynamically adding JAVA™ resources to, or updating JAVA™ resources in, a web application without requiring the web application or a corresponding application server to be restarted and without losing session state. Specifically, under the present invention, to preserve session information and prevent restarting of the end user web application, JAVA™ resources (e.g., JAVA™ ResourceBuldles) are not obtained directly (e.g., via the JAVA™ ResourceBundle.getBundle call), which would retrieve the JAVA™ resources from the class loader of the web application. Rather, JAVA™ resources are obtained indirectly from a separate web application (i.e., a Resource Lookup Web Application (RLWA)), whose only duty is to serve JAVA™ resources.

Referring now to FIG. 1, a web application server 10 including a plurality of web applications 12 (12A-C in this example) and a Resource Lookup Web Application (RLWA) 14 in accordance with the present invention is illustrated. Web application server 10 may comprise, for example, WEB-SPHERE Application Server from International Business Machines Corp. of Armonk, N.Y., or other suitable web application server now known or later developed. Web applications 12A-C may comprise, for example, a search engine, a shopping web application, a portal, etc. Although three web applications 12A-C are shown as operating within web application server 10, it should be clear that any number of web applications 12 (e.g., one or more) may be present without departing from the intended scope of the present invention.

RLWA 14 includes JAVA™ resources 16, which may include ResourceBundles, class files, etc. On startup, RLWA 14 places a reference to each JAVA™ resource 16 (or a way to get to each JAVA™ resource 16) in its servlet context with the Servlet API call "getServlet( ).setAttribute(resourceName, resource)," where "resourceName" is the name of the JAVA™ resource and "resource" is the object to be referenced dynamically. The Servlet API call "getServlet( ).setAttribute (resourceName, resource)," which is a well known call in a JAVA™ based web application server environment, and places a tag or similar identifier corresponding to each available JAVA™ resource 16 in a table that can be accessed by each web application 12A-C. In this manner, i.e., via its servlet context, the RLWA 14 "advertises" the JAVA™ resources 16 it has available to each web application 12A-C within web application server 10.

Each web application 12A-C can obtain a JAVA™ resource 16 from the RLWA 14 servlet context via the Servlet API call "getServletContext( ).getContext(url)," where "url" is the path to RLWA 14's servlet as defined in its web.xml file. This allows each web application 12A-C to see which JAVA™ resources 16 are available from RLWA 14. From that context, each web application 12A-C can call "getAttribute(resourceName)," where "resourceName" is the name of the desired JAVA™ resource. Referring to FIG. 1, arrows 18 represent JAVA™ resource 16 requests from web applications 12A-C to RLWA 14, while arrows 20 represent RLWA 14 responding with the requested JAVA™ resources 16. Again, the calls "getServletContext( ).getContext(url)" and "getAttribute(resourceName)," are commonly used to obtain JAVA™ resources in a JAVA™ based web application server environment.

A new or updated JAVA™ resource 16' (e.g., a ResourceBundle, class file, etc.), supplied by an external source, can be added in a known manner to RLWA 14 and loaded dynamically. While this will invalidate any session information on RLWA 14, it will not invalidate the session information for web applications 12A-C. Specifically, after the new or updated JAVA™ resource 16' has been added to RLWA 14, JAVA™ resource 16' is available to all of the web applications 12A-C and can be requested by, and provided to, a requesting web application 12A-C from RLWA 14 in the manner detailed above. The requesting web application 12A-C subsequently receives and uses the new or updated JAVA™ resource 16' without losing session information and without having to be restarted. In this way, the new or updated JAVA™ resource 16' can be used seamlessly and appear in the user interface of the requesting web application 12A-C without end users experiencing any downtime or loss of information. In other words, under the present invention, to preserve session information and prevent restarting of the web application 12A-C, new/updated JAVA™ resources 16' are not obtained directly (i.e., via the class loader of the web application), but rather indirectly from a separate web application (i.e., RLWA 14), whose only duty is to serve JAVA™ resources.

Typically, prior to the present invention, each web application in a web application server was required to load and install JAVA™ resources individually. Under the present invention, however, RLWA 14 manages JAVA™ resources 16, 16' for all of the web applications 12A-C, such that each JAVA™ resource 16, 16' is installed once at a single location and is commonly accessible to any web application 12A-C running in the web application server 10. Therefore, JAVA™ resources 16, 16' can be installed once in a single location in web application server 10, thereby reducing memory overhead, and then shared by any web application 12A-C residing in the same web application server 10.

Figure 2:
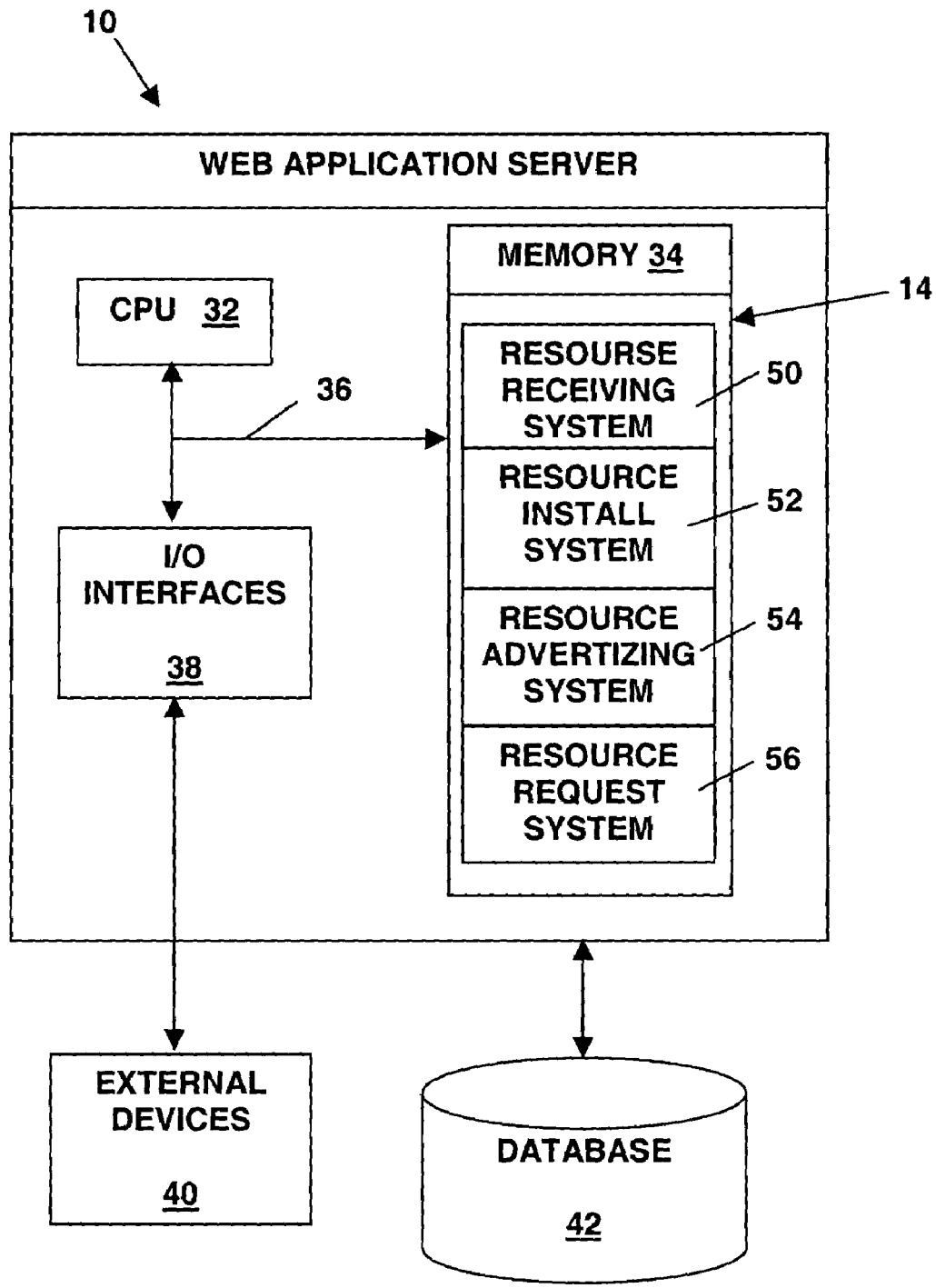
FIG. 2 depicts a more detailed view of a web application server including the RLWA shown in FIG. 1, in accordance with the present invention.

Referring now to FIG. 2, a more detailed diagram a web application server 10 is shown. In general, web application server 10 could be implemented on any computerized system capable of carrying out the functions of the present invention described herein. For example, the computerized system could be a personal computer, a workstation, a server, a laptop, a hand-held device, etc.

As shown, web application server 10 generally comprises central processing unit (CPU) 32, memory 34, bus 36, input/output (I/O) interfaces 38, external devices/resources 40 and storage unit 42. CPU 32 may comprise a single processing unit, or be distributed across one or more processing units in one or more locations. Memory 34 may comprise any known type of data storage and/or transmission media, including magnetic media, optical media, random access memory (RAM), read-only memory (ROM), a data cache, a data object, etc. Moreover, similar to CPU 32, memory 34 may reside at a single physical location, comprising one or more types of data storage, or be distributed across a plurality of physical systems in various forms.

I/O interfaces 38 may comprise any system for exchanging information to/from an external source. External devices/resources 40 may comprise any known type of external device, including speakers, a CRT, LCD screen, hand-held device, keyboard, mouse, voice recognition system, speech output system, printer, monitor/display, facsimile, pager, etc. Bus 36 provides a communication link between each of the components in web application server 10 and likewise may comprise any known type of transmission link, including electrical, optical, wireless, etc.

Storage unit 42 can be any system capable of providing storage for information, such as JAVA™ resources 16, 16', under the present invention. As such, storage unit 42 may reside at a single physical location, comprising one or more types of data storage, or be distributed across a plurality of physical systems in various forms. In another embodiment, storage unit 42 may be distributed across, for example, a local area network (LAN), wide area network (WAN) or a storage area network (SAN) (not shown).

Shown in memory 34 of web application server 10 is RLWA 14, which includes resource receiving system 50 for determining when new or updated JAVA™ resources 16' are available and for obtaining the new or updated JAVA™ resources 16'. In particular, when a new/updated resource is available, web application server 10 restarts the RLWA 14, and its initialization method is invoked. Resource receiving system 50 of RLWA 14 then checks for and obtains the new/updated resource during the processing of RLWA 14's initialization method. RLWA 14 further includes a resource install system 52 for dynamically installing new/updated JAVA™ resources 16' into RLWA 14, a JAVA™ resource advertising system 54 for advertising the availability of new/updated JAVA™ resources 16' to the web applications running in web application server 10 (e.g., web applications 12A-C, FIG. 1) via the Servlet API call "getServlet( ).setAttribute(resourceName, resource)" or other known manner. Although the dynamic installation/loading of the new/updated JAVA™ resources 16' into RLWA 14 will invalidate any session information on RLWA 14, it will not invalidate the session information for web applications 12A-C. Once the new/updated JAVA™ resources 16' have been added to RLWA 14, new/updated JAVA™ resources 16' are now available to all of the web applications 12A-C and can be requested from web application server 10 via resource request system 56. For example, the new/updated JAVA™ resources 16' can be requested by, and provided to, a requesting web application 12A-C from RLWA 14 using the above-described "getServletContext( ).getContext(url)" and "getAttribute(resourceName)" calls, or using other known techniques. A requesting web application 12A-C subsequently receives and uses the requested new or updated JAVA™ resource 16' without losing session information and without having to be restarted. In this way, the new or updated JAVA™ resource 16' can be used seamlessly and appear in the user interface of the requesting web application 12A-C without end users experiencing any downtime or loss of information. Indeed, an end user of the requesting web application 12A-C may never be aware that the above-described process has actually taken place.

Figure 3:
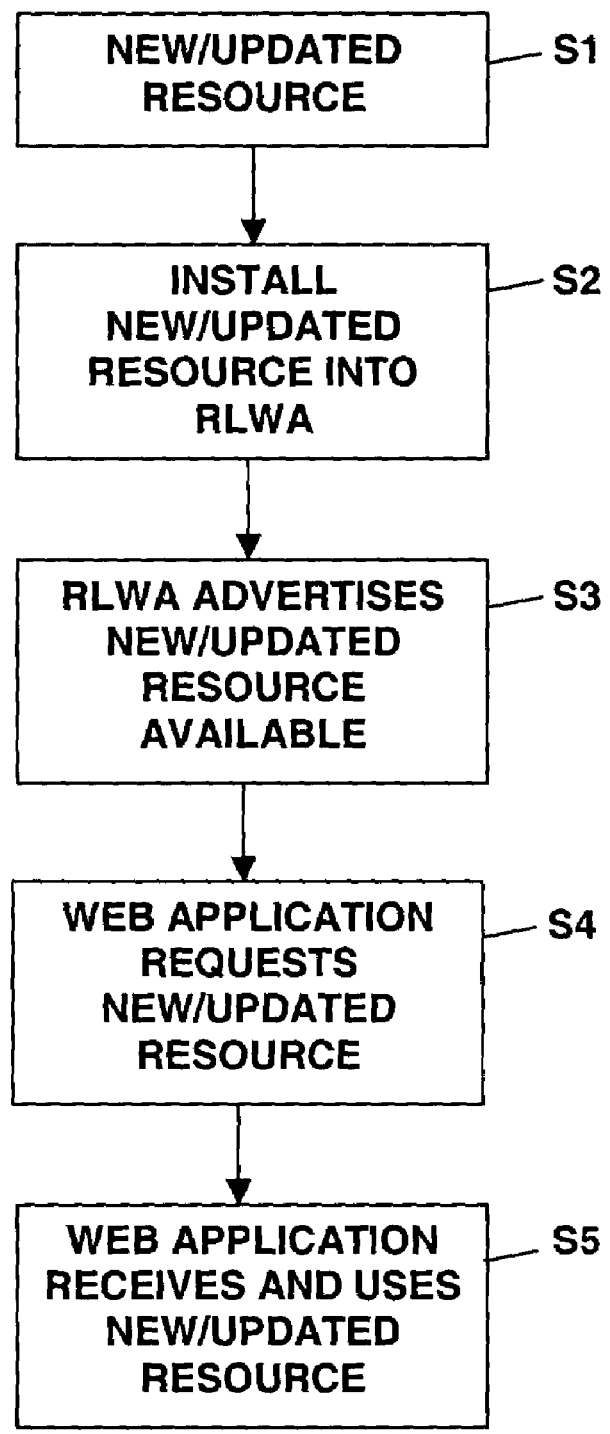
FIG. 3 depicts a method flow diagram according to the present invention.

Referring now to FIG. 3, a method flow diagram 100 according to the present invention is shown. As depicted, in step S1, RLWA 14 obtains a new or updated JAVA™ resource 16' when it become available. In step S2, RLWA 14 installs the new/updated JAVA™ resource 16'. Next, in step S3, RLWA 14 "advertises" the availability of the new/updated JAVA™ resource 16' to the web applications (e.g., web applications 12A-C, FIG. 1). This can be achieved by the RLWA 14, for example, using the Servlet API call "getServlet( ).setAttribute(resourceName, resource)." In step S4, one or more web applications request the updated JAVA™ resource 16' via the "getServletContext( ).getContext(url)" and "getAttribute(resourceName)" calls. Thereafter, in step S4, the requesting web application receives, dynamically adds, and uses the requested new/updated JAVA™ resource 16'.

It should be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

I claim:

1. A method for dynamically adding resources in a web application server, wherein the web application server includes at least one web application and a separate resource lookup web application, comprising:

providing a resource; wherein the resource comprises a JAVA ResourceBundle and is selected from a group consisting of a new resource and an updated resource;

detecting an availability of the resource using the resource lookup web application;

installing the resource into the resource lookup web application and, once installed, advertising the resource to the at least one web application;

receiving a request for the resource from the at least one web application; and dynamically adding the resource to each requesting web application without having to restart the requesting web application and without losing session information in the requesting web application, wherein the adding is performed indirectly through the resource lookup web application which acts as an intermediary between the at least one web application and the resource and has a duty to serve the resource.

2. The method of claim 1, wherein installing the resource into the resource lookup web application causes the resource lookup web application to lose session information.

3. A method for dynamically adding resources in a web application server, wherein the web application server includes at least one web application and a separate resource lookup web application, comprising:

dynamically adding a JAVA resource to the at least one web application in the web application server without having to restart the web application and without losing session information in the web application, wherein the JAVA resource comprises a JAVA ResourceBundle; and wherein the web application server further includes the resource lookup web application for:

detecting an availability of the JAVA resource;

installing the JAVA resource and, once installed, advertising the JAVA resource to the web application;

receiving a request for the JAVA resource from the web application; and providing the JAVA resource to the web application;

wherein the adding is performed indirectly through the resource lookup web application which acts as an intermediary between the at least one web application and the resource and has a duty to serve the JAVA resource.

4. The method of claim 3, wherein the JAVA resource is selected from a group consisting of a new JAVA resource and an updated JAVA resource.

5. A system implemented in a computer for dynamically adding resources in a web application server through a processor, wherein the web application server includes at least one web application and a resource lookup web application, comprising:
- a system for detecting a resource; wherein the resource comprises a JAVA ResourceBundle and is selected from a group consisting of a new resource and an updated resource;
- a system for installing the resource into the resource lookup web application and, once installed, for advertising the resource to the at least one web application; and
- a system for receiving a request for the resource from the at least one web application and for providing the resource to each requesting web application, wherein the resource is dynamically added to each requesting web application without having to restart the requesting web application and without losing session information in the requesting web application, wherein the adding is performed indirectly through the resource lookup web application which acts as an intermediary between the at least one web application and the resource and has a duty to serve the resource.

6. A program product stored on a computer readable medium for dynamically adding resources in a web application server, wherein the web application server includes at least one web application and a resource lookup web application, which when executed by a computer, comprises:
- program code for detecting a resource; wherein the resource comprises a JAVA ResourceBundle and is selected from a group consisting of a new resource and an updated resource;
- program code for installing the resource into the resource lookup web application and, once installed, for advertising an availability of the resource to the at least one web application; and
- program code for receiving a request for the resource from the at least one web application and for providing the resource to each requesting web application, wherein the resource is dynamically added to each requesting web application without having to restart the requesting web application and without losing session information in the requesting web application,
- wherein the adding is performed indirectly through the resource lookup web application which acts as an intermediary between the at least one web application and the resource and has a duty to serve the resource.

* * * * *